(12) United States Patent
Brigham (10) Patent No.: US 7,966,943 B2
(45) Date of Patent: Jun. 28, 2011

(54) MASS TRANSIT VEHICLE SYSTEM

(76) Inventor: Georges Brigham, New Canaan, CT (US)

( * ) Notice: Subject to any disclaimer, the term of this patent is extended or adjusted under 35 U.S.C. 154(b) by 50 days.

(21) Appl. No.: 12/612,810

(22) Filed: Nov. 5, 2009

(65) Prior Publication Data

US 2010/0043665 A1 Feb. 25, 2010

Related U.S. Application Data

(63) Continuation of application No. 11/367,988, filed on Mar. 3, 2006, now abandoned.

(60) Provisional application No. 60/658,730, filed on Mar. 4, 2005.

(51) Int. Cl.
*E01B 25/00* (2006.01)

(52) U.S. Cl. ........... 104/130.07; 104/130.01; 104/88.01; 105/72.2; 105/215.2

(58) Field of Classification Search ............. 104/130.01, 104/130.07, 130.03, 130.02, 88.01; 105/72.2, 105/215.1, 215.2
See application file for complete search history.

(56) References Cited

U.S. PATENT DOCUMENTS

| | | | |
|---|---|---|---|
| 3,673,966 A | 7/1972 | Wilson | |
| 3,768,417 A * | 10/1973 | Thornton et al. | 104/282 |
| 3,812,789 A | 5/1974 | Nelson | |
| 3,831,527 A * | 8/1974 | Peterson | 104/130.07 |
| 3,835,785 A | 9/1974 | Kirschner et al. | |
| 3,841,225 A | 10/1974 | Johnson | |
| 3,859,925 A * | 1/1975 | Hartz | 104/139 |
| 5,063,857 A | 11/1991 | Kissel, Jr. | |
| 5,138,952 A | 8/1992 | Low | |
| 5,590,604 A | 1/1997 | Lund | |
| 5,671,680 A * | 9/1997 | DelGreco | 104/130.07 |
| 5,794,535 A * | 8/1998 | Pardes | 104/130.07 |
| 5,813,349 A * | 9/1998 | Jensen | 104/28 |
| 6,129,025 A | 10/2000 | Minakami et al. | |
| 6,182,576 B1 * | 2/2001 | Svensson | 104/120 |
| 6,220,173 B1 | 4/2001 | Sauerwein | |
| 6,263,799 B1 | 7/2001 | Pardes | |
| 6,314,890 B1 * | 11/2001 | Geldbaugh | 104/242 |
| 6,318,274 B1 | 11/2001 | Park | |
| 6,324,994 B1 * | 12/2001 | Glenn | 105/72.2 |
| 6,389,982 B1 | 5/2002 | Evensen | |
| 6,418,856 B2 * | 7/2002 | Hossfield et al. | 104/130.01 |
| 6,490,980 B1 * | 12/2002 | Mosby | 105/397 |
| 6,619,212 B1 | 9/2003 | Stephan et al. | |
| 6,659,014 B2 | 12/2003 | Chaabi | |
| 6,668,729 B1 | 12/2003 | Richards | |
| 6,857,374 B2 * | 2/2005 | Novacek | 104/130.07 |
| 2006/0201376 A1 * | 9/2006 | Brigham | 104/130.07 |
| 2010/0043665 A1 * | 2/2010 | Brigham | 104/88.01 |

OTHER PUBLICATIONS

International Communications Inc., "Science & Technology for the Technical Men in Management", Feb. 1969, 13 pages.

* cited by examiner

*Primary Examiner* — S. Joseph Morano
*Assistant Examiner* — Jason C Smith
(74) *Attorney, Agent, or Firm* — Cantor Colburn LLP (57) ABSTRACT

A transport system for providing increased capacity to move individuals and freight while still accommodating the individual needs of passengers and freight movers to travel to unique destinations. The transit system including a car including a set of switching wheels that are designed to engage with a set of switching rails, the switching wheels being moveable to selectively engage with the switching rails to either maintain the car on the track or switch the car off to another track. The car has the capability to travel on the relatively high-speed track and on a conventional surface street.

4 Claims, 6 Drawing Sheets

MASS TRANSIT VEHICLE SYSTEM

CROSS-REFERENCE TO RELATED APPLICATIONS

This application is a continuation of U.S. patent application Ser. No. 11/367,988, filed Mar. 3, 2006 now abandoned, which claims the benefit of the filing date of U.S. Provisional Patent Application Ser. No. 60/658,730 filed Mar. 4, 2005.

FIELD OF THE INVENTION

The present invention relates to transportation systems intended to reduce highway congestion and crowding, with flexibility and independent control of vehicles.

BACKGROUND OF THE INVENTION

Traffic congestion is a significant problem in the United States as well as in many countries throughout the world, costing many billions of dollars annually. Although some people have and will in the future alter their commuting preferences in view of the state of traffic congestion problems, there is limited willingness of many people to do so. While "telecommuting" may reduce some traffic, workers and freight inevitably will need to be transported from one location to another. The transportation system should be improved to meet the needs of today's society.

Ground transportation systems typically comprise three major entities: links, nodes and vehicles. Links are the corridors, which may comprise for example, highways or railroads, mostly on the ground but occasionally in tunnels or elevated. Nodes may comprise for example, connections between two roadways or tracks, between a track and a sidetrack leading to a station or stop-off, or access to open roads and streets. Vehicles are automobiles, buses, trucks and freight cars, providing both person and freight transportation.

A single lane of traffic can carry 2000 cars or more an hour as the peak builds up, usually at commuting time. At this throughput level, any disturbance causes a severe disruption in traffic flow. Such disturbances may include traffic incidents (even in the opposite lanes), a driver slowing down, something taking away the drivers' attention and, in any case, an increase in traffic volume feeding in from other roads. The shortest achievable average headway (the time interval between two cars) in normal traffic, corresponding to a flow of 2000 vehicles per hour is 1.8 seconds. The headway does not imply any particular speed. But two extremes of speed should be noted.

First, at 200 mph, race drivers routinely maintain a separation of one car length or less, equivalent to a headway of $\frac{1}{15}$ sec, some 25 times shorter than on the highway. The minimum headway on the road is dictated by what might be called the "average human reaction time" of two thousand people who drive often under normal road conditions. The reduced headway for race drivers is inconceivable for today's highway configuration, but is entirely conceivable on a special track utilizing automatic controls.

Second, at 10 mph or 15 ft/sec, a car 15 feet long would barely have time to get by a particular point on the road, requiring 1 second headway; a 40 foot coach would require a minimum speed of 27 mph (40 ft/sec); a 60 ft tractor trailer combination, 41 mph (60 ft/sec). At the lower speeds, traffic capacity is necessarily lower because the headway is necessarily longer to allow time for the vehicle itself to pass by. This is the speed barrier. Above this speed, capacity can increase, of course, but the controlling factor is then the headway.

In considering the implications of this data, assume that, with automated vehicle control, headway is halved to 0.9 second, allowing 4000 cars per hour (and from now on we shall refer to any vehicles in this context as "cars", whether automobiles, coaches, trucks or freight cars of any capacity). If all cars are freight cars carrying a 20 ton load, one track has a freight capacity of 80,000 tons per hour; if all cars carry 50 passengers, the track capacity is 200,000 passengers per hour; or a mix of the two.

Congestion is the result of passenger cars carrying on average 1.6 persons per car. At today's maximum per-lane capacity of 2000 vehicles per hour, this amounts to just over 3,000 passengers per hour, in contrast with possibly 200,000 as stated above or even more. Therefore, one response to traffic congestion is use of mass transport; however, mass transport today comprises the railroad systems. Railroads have specific drawbacks, namely, they do not typically go where individual passengers or freight businesses want to go. Rather, the railroad may generally go from one area to another area, but additional transport is needed to get to and from the railroad station. Such additional transportation can be expensive and time-consuming; this is especially the case for freight businesses. As a result, the railroads have lost freight business to trucking, and passenger traffic to automobiles.

One common response to traffic congestion is simply to build more roads. However, adding one lane carrying 3000 passengers maximum or perhaps 1500 per hour on average for 24 hours, yields approximately $1.3 \times 10^7$ passenger miles a year. This is less than one thousandth of 1 percent of the total of $1.9 \times 10^{12}$ passenger-miles a year totaled for the United States. As a result, adding 1000 lane segments in 1000 critical areas would yield approximately a 1% increase in the total, a marginal improvement at best. Furthermore, obtaining right-of-ways to build new roads or even widen existing roads is a difficult and sometimes, almost an impossible task.

Therefore, what is desired is a system that reduces traffic congestion while still accommodating the individual needs of individuals.

It is further desired to provide a system that increases the number of passengers and/or amount of freight that can be transported at any particular time.

It is still further desired to provide a system that provides a flexible approach to mass-transit by increasing the flow of cars moving along a track while still providing for transport of persons and/or freight from and to individual destinations.

SUMMARY OF THE INVENTION

These and other objects are achieved in one advantageous embodiment by the provision of multi-passenger, coach-like vehicles ("cars") and freight cars, operated on a track with greatly increased capacity compared to standard vehicle traffic on a roadway. The cars are provided such that they may operate both on a high-speed track and upon standard surface streets.

The reduced headways for the cars operating on the track require automatic controls accommodating enhanced forms of freight cars and passenger coaches. While the speed of the cars may be increased above the speed of typical highways and railways today, speed is not the critical factor of the system. Rather, capacity of cars and track is the critical factor that is improved.

The improved headway is achieved by use of a specialized track for the car to run upon. In one advantageous embodiment, the track is provided with two horizontal riding surfaces spaced for stability (8.5 feet to conform to highway rules), and two vertical guide walls against which ride horizontal wheels, to provide absolute directional control in all conditions. The track is advantageously provided with a switching mechanism that allows cars to enter and leave the track without any movement of the track itself. The ability of cars to enter and leave the main track without any movement of the track itself has provided for significant improvement in headway. It is the ability for any car to switch to any other track, or off or onto the track that creates a high capacity, high-speed network.

It is further contemplated that in one advantageous embodiment, the cars are provided with twenty wheels for various applications. For example, eight of the wheels may be provided as driving wheels placed in pairs in tandem at the four corners. These are the wheels that support the weight of the car both on and off of the track and are provided to steer the cars when off of the track. Four of the wheels are horizontal guide wheels, which are positioned horizontal to the driving wheels and ride against the guide walls when the car is in the track. Additionally, eight of the wheels may be provided as switching wheels, which are positioned in the same horizontal orientation as the guide wheels. The switching wheels are used to steer the car when the car is in a switch area. The switching wheels are provided in linked pairs that straddle the center of the track. These pairs of wheels are raised or lowered individually and opposite to each other to either maintain the car on the main track or turn the car to exit the main track, whether into a station or onto another track. In this manner, rather than having the track move, the car is provided with switching wheels to transfer the car on to and off of the main track.

It is further contemplated that in another advantageous embodiment, the cars are 8½ ft wide, the normal maximum width for a vehicle on the road. The cars may, in one advantageous embodiment, be 50 feet or so long so as to accommodate a relatively large number of passengers, and may be even longer for freight applications. Cars may be provided double-ended, having two identical ends. The cars are further self-propelled and may use any form of engine that is suitable, such as for example, a combustion engine, electric, hybrid, fuel cell or the like. The cars operate bi-modally, on track most of the time, but on the ground as well and may be steered or operated from either end of the vehicle. For example, it is helpful for a passenger coach to extend its range somewhat beyond the track station, such as to an office building or an airline terminal or special venue. For freight applications, it is highly desirable for the freight car to reach the factory door, the distribution dock, the produce field, etc. thereby eliminating the need to transfer the freight to yet another transporting vehicle.

In one advantageous embodiment, a method for driving a car along a stationary track in a mass-transit system is provided comprising the steps of propelling the car along a length of the track, the car propelled by driving wheels engaging with a surface of the track, and maintaining the car substantially centered on the track with a set of guide wheels that engage with guide walls positioned along a length of the track. The method further comprises the steps of positioning switching wheels on the car perpendicular to the driving wheels and switching the car to another track or maintaining the car on the current track by variously engaging sets of switching wheels on the car with switching rails on the track.

In another advantageous embodiment, a car for mass-transit system is provided comprising, an elongated body section for holding persons and/or freight, and a set of ground engaging driving wheels, positioned at the corners of the elongated body section for supporting the weight of and providing a driving force to the body section. The car further comprises a set of guide wheels positioned essentially perpendicular to the set of driving wheels, the guide wheels provided to engage with guide walls of a track to maintain the elongated body section substantially centered in the track, and a set of switching wheels, positioned on an underside of the elongated body section, the switching wheels provided to engage with a set of switching rails on the track.

In still another advantageous embodiment, a switching node for a track for a mass-transit system is provided comprising, a driving surface, extending along a length of the track, for engaging with driving wheels of a car, and a set of guide walls, extending along a length of the track, for engaging with guide wheels of the car to maintain the car substantially centered within the track. The switching node further comprises a set of switching rails positioned at a node, for engaging with switching wheels of the car to either maintain the car on the track or allow the car to transfer off of the track. The switching rails include two substantially straight rails extending along a length of the track and staggered relative to each other, the two substantially straight rails designed to engage with a first set of switching wheels to maintain the car on the track when the first set of wheels is lowered to engage with the substantially straight rails. The switching rails further include two curved rails extending along a transition to another track, the two curved rails designed to engage with a second set of switching wheels to switch the car to another track when the second set of wheels is lowered to engage with the curved rails.

Other objects of the invention and its particular features and advantages will become more apparent from consideration of the following drawings and accompanying detailed description.

DETAILED DESCRIPTION OF THE INVENTION

Referring now to the drawings, wherein like reference numerals designate corresponding structure throughout the views.

Figure 1:
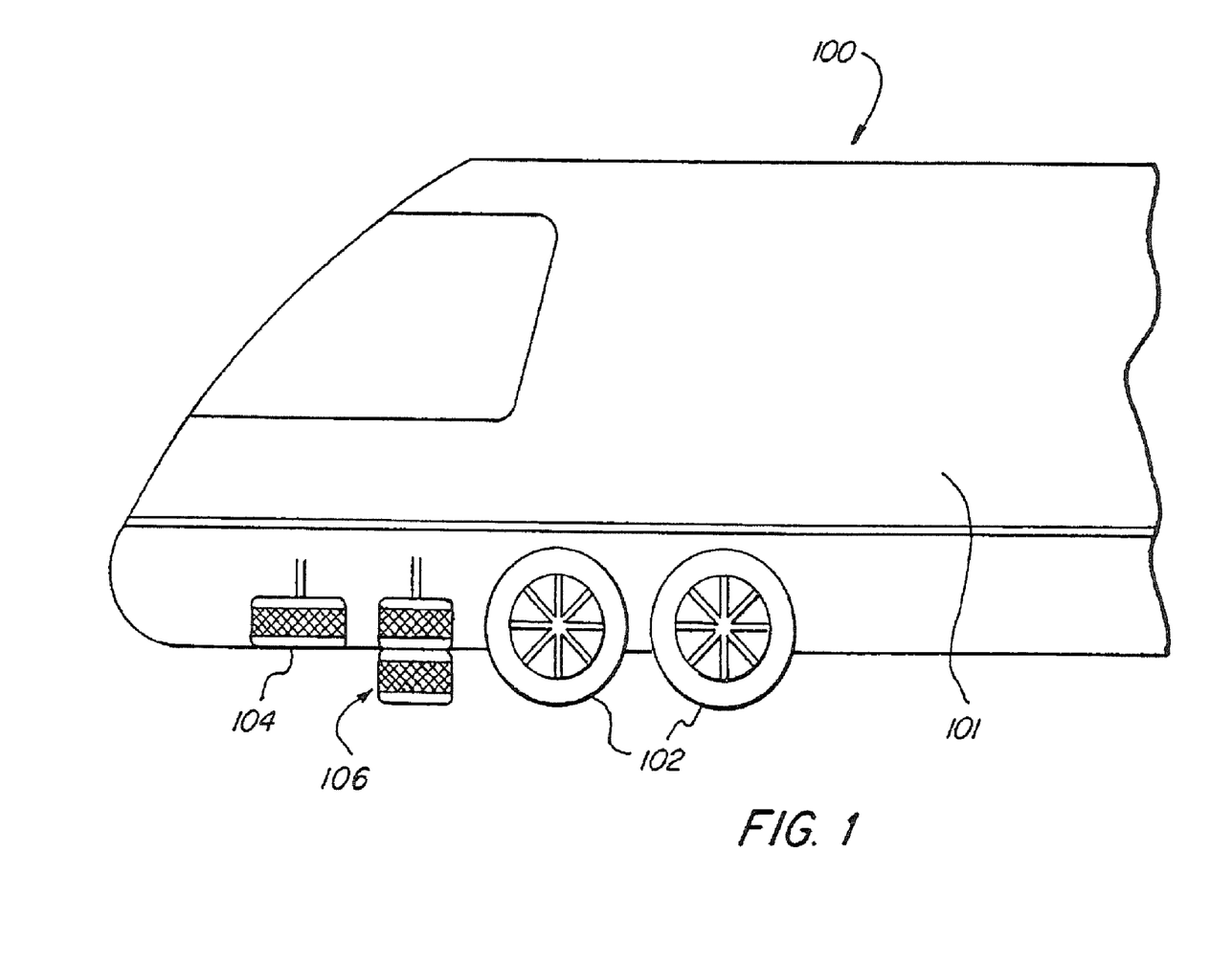
FIG. 1 is an illustration of one advantageous embodiment depicting an end of a car.

FIG. 1 is an illustration of an advantageous embodiment of one end of a car 100 that may be used in connection with the present invention. It is contemplated that both ends of car 100 may be identical. Car 100 is depicted with a number of sets of wheels. For example, a set of two driving wheels 102 is illustrated to engage with the ground. It is contemplated that a total of eight driving wheels 102 may be provided at the corners of car 100 in a tandem arrangement. In this manner, not only is the weight carrying capacity increased, but in case one of the tires bursts, an additional wheel is provided to carry car 100 until car 100 can come to a stop for replacement of the damaged driving wheel 102. It is further contemplated that while eight driving wheels 102 are selected for an advantageous embodiment, any number of driving wheels 102 may be selected depending upon the application. For example, for relatively heavy freight applications, it may be desirable to provide car 100 with sixteen driving wheels for bearing the additional weight.

The tires may be designed for normal operation up to, for example, 200 mph, with a normal load of 8,000 lb, so that a freight car at 32 tons fully loaded conforms on the street to the usual limit of 16,000 lbs per axle. Additionally, on the street, the tires must deflate automatically to avoid damage to warm asphalt in the summer.

In still another advantageous embodiment, the driving wheels 102 provide all-wheel steering. While on the track 200 (FIG. 2), the steering provided by driving wheels 102 is nominal, however, for street applications, the steering of driving wheels 102 is the primary means for steering car 100.

Also illustrated in FIG. 1 is an example of a guide wheel 104, which is designed to engage with guide walls 202 to maintain car 100 substantially centered in track 200. As suggested in FIG. 2, four guide wheels 104 are mounted to car 100 in a horizontal mounting position and ride against the guide walls 202. The guide wheels 104 project about 0.5 foot outside body 101 of car 100, to provide clearance, and retract when the car 100 operates on a conventional road. Guide wheels 104 spin freely, as fast or slowly as the car speed requires. The track may curve, so that these guide wheels must press against the walls up to a point.

Figure 2:
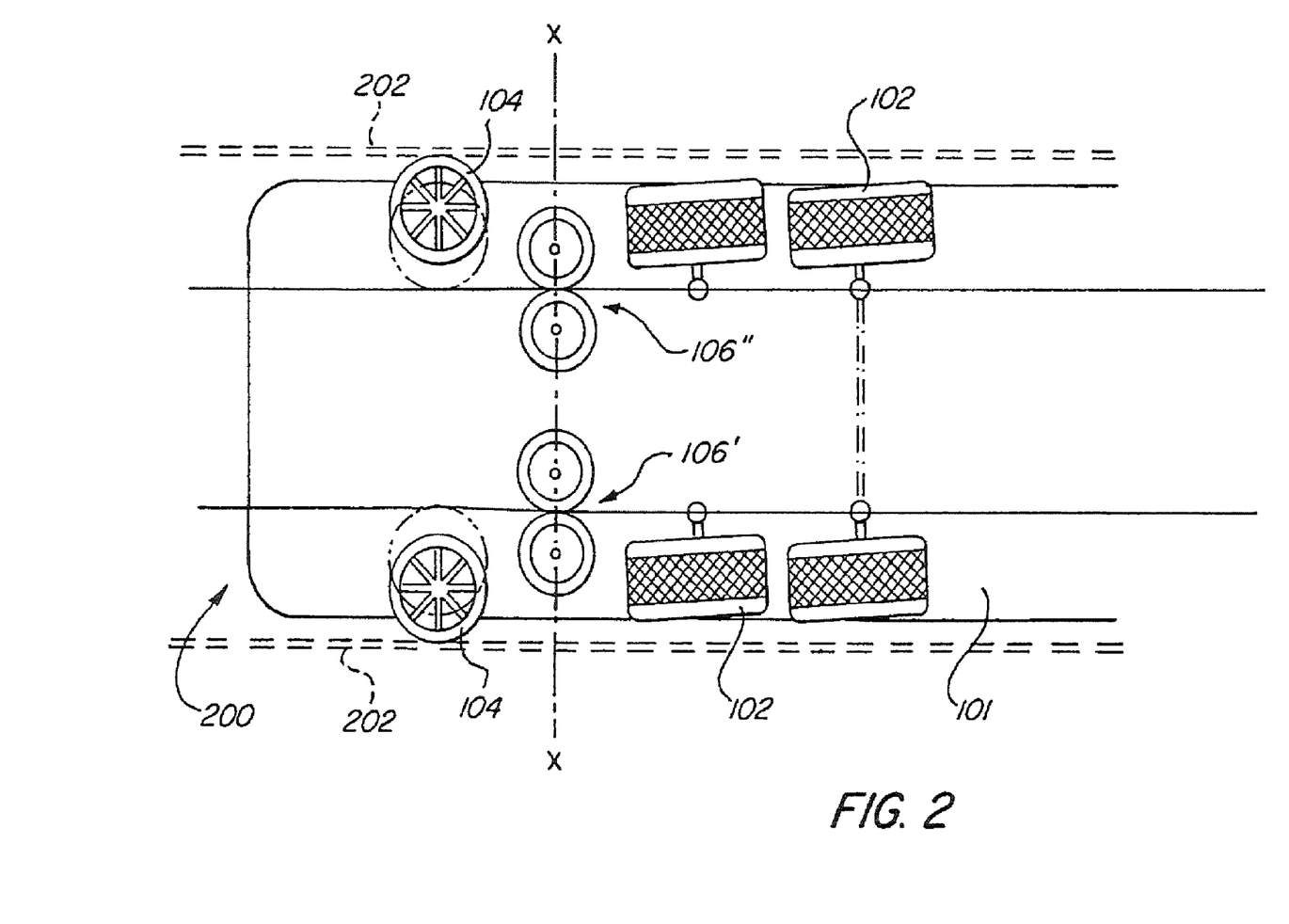
FIG. 2 is an illustration of the underside of the car according to FIG. 1.

Guide wheels 104 are mounted to the frame of the car 100 so that the guidance provided by the guide walls 202 is transferred to car 100 and car 100 is kept centered on the track 200.

There is a limit to the degree of curvature that can be permitted in the construction of track 200. The limit of the curvature of the turn is defined by the location of the guide wheels and the length of the car. The curvature of the track cannot be any greater than that where the outside guide wall would be touching the front and rear corners of the car and both the guide wheels on the same side. The coordinate axis of the curvature of a circle is taken along the front and one side of the car, with the origin at 0. From plane geometry, fitting a circle to these four points leads to its center having its X coordinate at $$L \div 2 \qquad \text{[Formula 1]}$$

where L is the length of the car, and its Y coordinate at $$((B \times L) - +/PB*2) \div 2 \times P \qquad \text{[Formula 2]}$$

(formulas utilize APL notation) where P is the protrusion of the guide wheels outside the car, and B is the setback from the end of the car. The radius is therefore the square root of the sum of both of these squared. In one statement, letting RO be the radius:

$$RO \leftrightarrows (+/((L/2),((B \times L) - +/PB*2) \div 2 \times P)*2)*0.5 \qquad \text{[Formula 3]}$$

For a typical case of a car 60 ft long and a guide wheel protruding 6" and set back 4 ft, the tightest radius of curvature is approximately 226 ft. The corresponding speed can then be calculated, for a centrifugal acceleration A, as:

$$(A \times RO)*0.5 \qquad \text{[Formula 4]}$$

Allowing a g-force of ¼ of gravity, or 8 ft/sec², this is 43 ft/sec or 29 mph.

The curvature of the track is similarly limited by the curvature of the inside wall so as not to touch the side of the car between the two guide wheels on the same side. In one statement, letting RI be the radius:

$$RI \leftrightarrows (+/P(B-L/2)*2) \div 2 \times P \qquad \text{[Formula 5]}$$

For the same typical car, the tightest radius of curvature is approximately 676 ft. and the corresponding speed is 74 ft/sec or 50 mph. It should be noted that variations are possible to suit different track layouts.

Since the tighter turns require the elimination of one or both guide walls, steering must revert first to the driving wheels. But, for safety reasons, the switch wheels and rails can also come into play, substituting for the lack of guide walls for as long as these have to be removed. They can cease, as soon as the curvature returns to a sufficiently low value.

Figure 3:
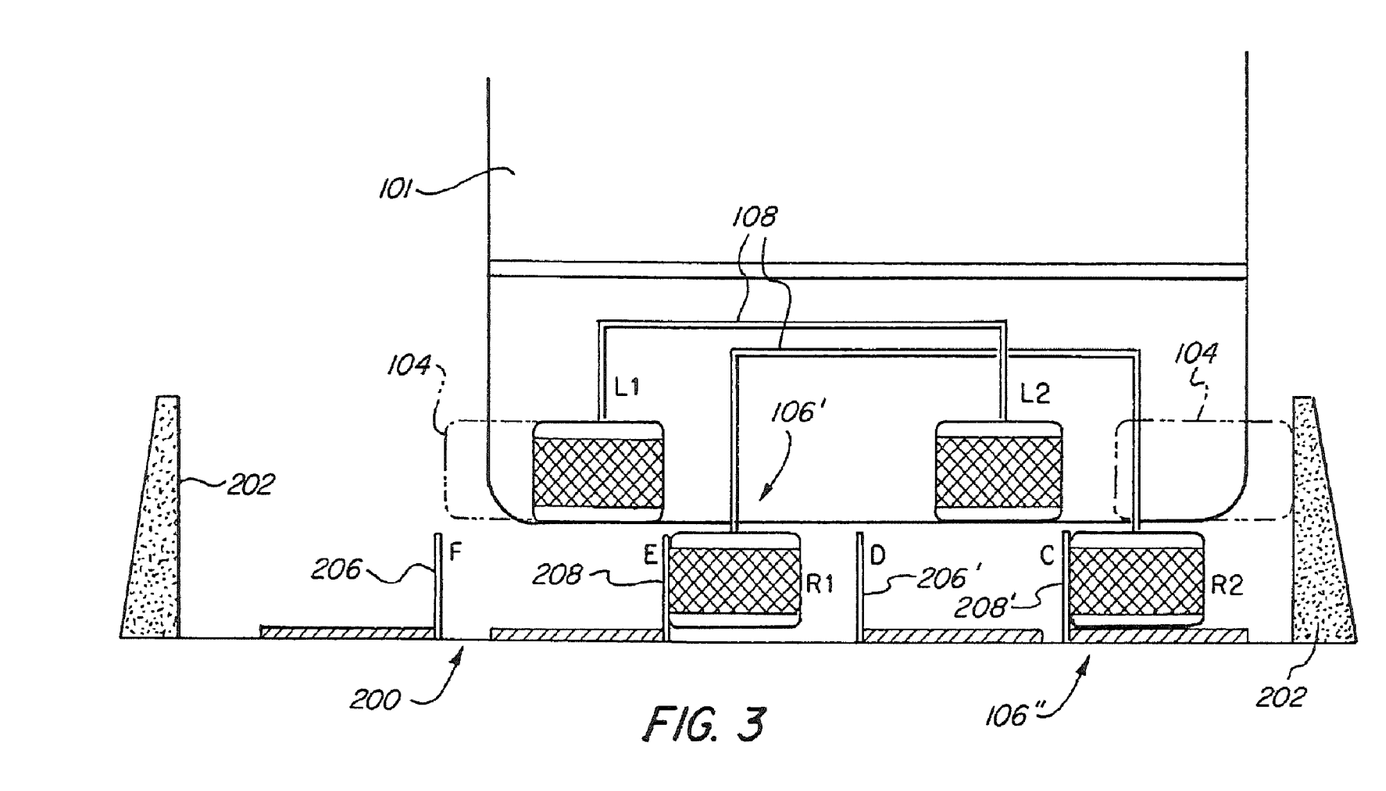
FIG. 3 is an illustration of the operation of the switching wheels of the car according to FIG. 1.

Also illustrated in FIGS. 1-3 are switching wheels 106. In this advantageous embodiment, eight switching wheels 106 are provided as four sets of linked pairs (106', 106", 106''', 106'''') that straddle a center of the track 100. These pairs of wheels are raised or lowered individually and opposite to each other. For each pair of switching wheels 106, when one pair is up, the other pair must be down and vice versa. These pairs operate for right or left switching will be discussed further in connection with FIGS. 3 and 4.

When car 100 is not on track 200, all of the switching wheels are raised to avoid hitting any obstruction on the standard roadway. In addition to a raising mechanism 108, these wheels need a small electric motor (not shown) to bring their rotation speed to match the speed of the car 100, so that there is no shock when engaging a switch rail as discussed hereafter.

When car 100 comprises a passenger car, car 100 may be provided with fifteen rows of seats, double on one side and single on the other, with an aisle in between. This would, for example, comfortably accommodate 45 people for trips of relatively long duration and up to 75 for short commuter trips with three in the double seat and a jump seat in the isle.

It is contemplated that a single track 100 in each direction in a geographic area can provide a significant increase in the capacity of today's transit system. However, to create a network of tracks 200, there must be a switching location 250 between tracks 200; and automatic controls (not shown) interacting with the cars 100.

Figure 4:
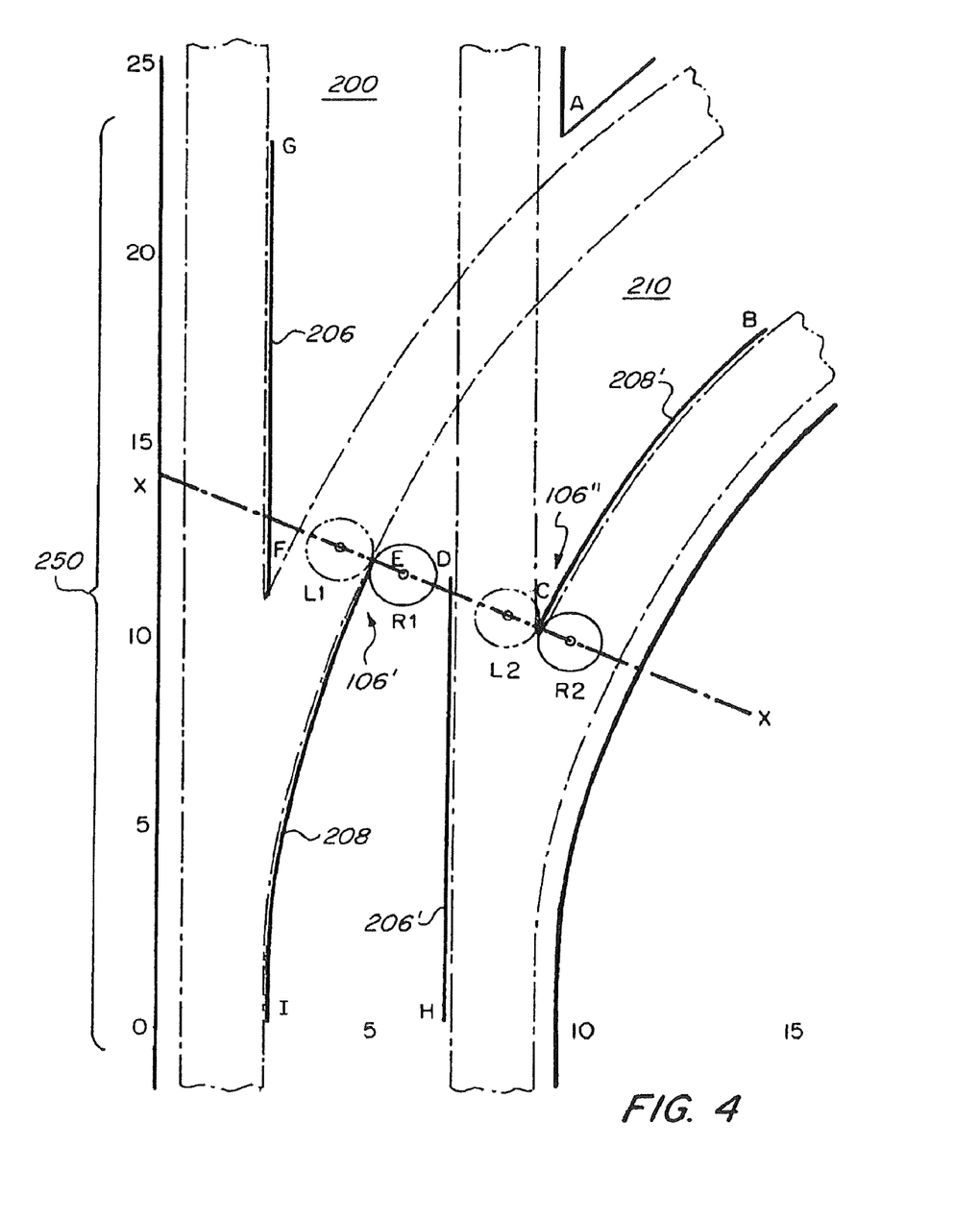
FIG. 4 is an illustration of the interaction of the switching wheels with the track according to FIG. 3.

The pairs of switching wheels 106 seen in FIGS. 3 and 4, are labeled "R" and "L". The pairs are linked and operate as one. Either can be raised or lowered, but they are interlocked so that both cannot be lowered together. Switching is performed entirely by each car 100, according to its ultimate destination. Each switching node 250 is predetermined, subject only to overall traffic control.

The guide walls 202 define this switching node 250. As an example, for a top speed of 60 mph and 0.2 g lateral acceleration, the switch location 250 is 150 ft between points A and H (FIG. 4); for a top speed of 200 mph and 0.25 g, this changes to 450 ft.

An example of switching node 250 will now be discussed with reference to FIGS. 3 and 4. Guide walls 202 are illustrated for engaging with guide wheels 104. Also, switch rails 204 are illustrated including substantially straight switch rails 206, 206' and curved switch rails 208, 208'. The right pair of switching wheels 106 is down and in use, the left is up and unused at this instant. Switching node 250 begins at points I and H of rails 206' and 208. R1 having been lowered catches first switch rail 208 (I-E) and forces the car 100 to the right branch 210, compensating for the guide wall 202, from which the right branch 210 is diverging. R2 was lowered simultaneously, so that it catches the second switch rail 208' (C-B) just before first switch rail 208 (I-E) ends, thereby maintaining full directional control on the left of the car 100. The right guide wall 202 keeps right-hand guidance at all times. By the time second switch rail 208' (C-B) ends, the left guide wall 202 of the right branch 210 of the fork appears at A, to resume left directional control.

The switch rails 204 are designed with a height that will allow for clearance of switching wheels 106 when in a raised position. For example, switch rails 264 may be selected to have a height of 12 inches, however, the height will vary depending upon the design and clearance of the car 100 and switching wheels 106.

Switching to the left branch operates similarly, except, of course, for using the left switch wheels 106 against switch rails 206 (F-G) and 206' (H-D).

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Figure 5A:
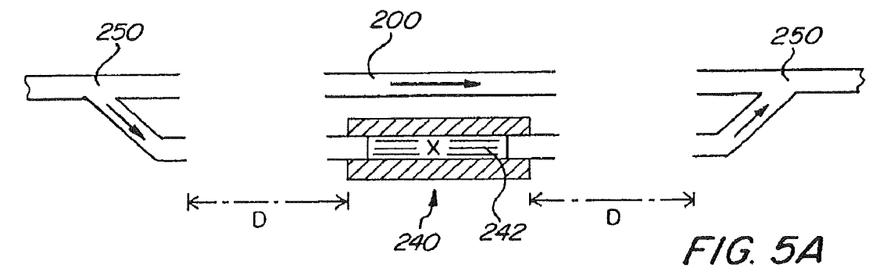
FIG. 5A is an illustration of a side track for the car according to FIG. 1.
Figure 5B:
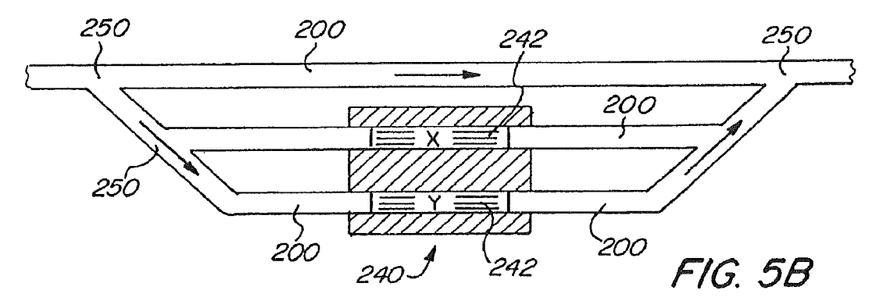
FIG. 5B is an illustration of another side track for the car according to FIG. 1.
Figure 5C:
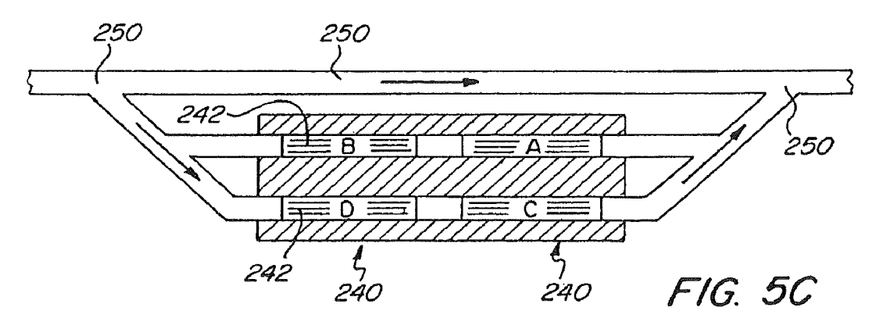
FIG. 5C is an illustration of still another side track for the car according to FIG. 1.
Figure 6:
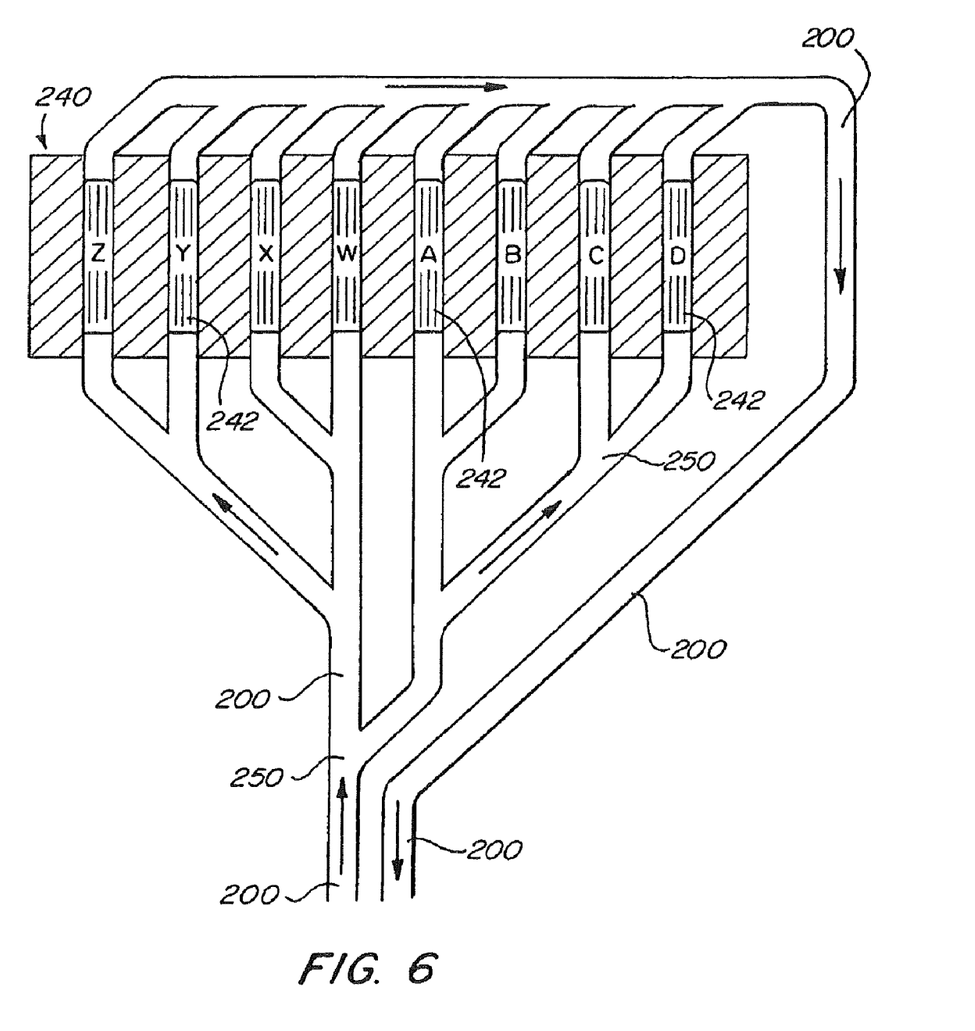
FIG. 6 is an illustration of a station for the car according to FIG. 1.

Referring now to FIGS. 5A-6, various stations 240 are illustrated. It is contemplated that in one advantageous embodiment, the stopping time may be 1 minute, generally sufficient to load and unload passengers in one car, or for a driver to take over or release a freight car. These stops may be intermediate stations or terminals, large or small. A few representative cases, starting with freight are described as follows.

A freight station 240 serves freight cars 100 as the interchange to the general road network, which freight cars 100 must use to complete delivery or to pick up new loads. Two ramps—one on, one off—may make the connection. The "yard" need only provide a brief stopping area at the end of each ramp and some open space to satisfy whatever traffic uses that stop. As a car 100 arrives, empty or loaded, a driver must be available to take over either to drive off directly or at least to park the car. The reverse applies for cars getting onto the system. The area must be large enough to accommodate the vagaries of pick-up and deliveries. It amounts to a parking lot, with minimal facilities for waiting drivers. While it is contemplated that in one embodiment the limit is 1 car per minute if the cars stop at the end of the access ramp, the track 200 may be separated into two tracks and double the capacity and so on.

Passenger stations 240 may vary widely, primarily as to size. For discussion purposes, consider through stations (FIGS. 5A-5C) versus terminals (FIG. 6) (the latter require a reversal of direction of the cars). The volume of traffic will dictate the number of individual berths 242, one berth 242 serving one car 100. More berths are possible along one platform (FIG. 5C).

The simplest station 240—serving the smallest traffic volume—requires one set of switching nodes 250 to leave the main track 200 and return (FIG. 5A).

The curves in the track 200 are squared off for discussion purposes and one berth 242 corresponds to one car 100, shown by an X. FIG. 5A is broken to reflect D, the distance for the car to decelerate from, and to accelerate to, the speed of travel on the main track 200. It is contemplated that if a stop takes 1 minute, cars 100 can arrive at most once a minute, 60 an hour, giving a maximum capacity of 2,700 passengers per hour at the usual seating or 4,500 at commuting capacity.

For greater volume, the station 240 needs two switching nodes 250, on and off as illustrated in FIG. 5B. For example, cars 100 can arrive at 30 sec. intervals, the maximum capacity doubles to 2 cars per minute, 120 per hour, 5,400 (9,000 commuting capacity) passengers per hour. It is also possible with two switching nodes 250 (in and out) to put berths 242 in tandem along each platform (FIG. 5C), to yield a capacity of 180 cars per hour and so forth.

Terminals are another form of station 240, but they require cars 100 to reverse their travel direction in some fashion rather than to continue along the original track 200. One possible layout with 8 berths, for instance, is illustrated in FIG. 6.

For example, cars 100 come in from the south, on the left (northbound) track and switch up to three times to stop at one of eight berths 242. After unloading, loading or both, a car 100 goes through and switches to the right into the cross track 200, turns right once more and goes out on the rightmost (southbound) track 200. While multiple switching nodes 250 and berths 242 are provided, it is contemplated that two tracks 200 as illustrated can feed and empty the terminal.

In this example, eight berths 242 would accommodate eight cars 100 per minute, a headway of 7.5 seconds, which for cars 100 of 60 ft lengths corresponds to a speed barrier of 8 ft/sec or 5 mph. Even relatively tight turns would accommodate this.

Another form of station 250 is the open station, similar to a freight yard, to serve, for instance, a large sports arena which already has a large parking area. Two tracks 200 are required, as usual, inbound and outbound. As an example, it is desired to bring all the attendants to an arena of 100,000 in a relatively short time frame, say 40 minutes. This means 2,500 people per minute, requiring 55 cars 100 per minute at normal seating or 33 cars at commuter seating. The track 200 can handle this as a headway of 1.1 sec. (at normal seating), which is only a little less than the current 1.8 sec. for cars under human control. With 1 minute stopping time, there must be room on the ground for either 55 or 33 cars 100 at any moment, which in turn requires the same number of ramps, in and out. Any open ground can serve to hold the cars 100, since there is no need for platforms.

It is further contemplated that the system may further be used, not only to transport a large number of individuals to a particular location, but may further be used to evacuate a relatively large number of individuals from a location in an emergency. For example, the evacuation of 100,000 people in a span of approximately 40 minutes.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A mass transport system comprising:
   a track having a first portion, said first portion comprising:
   a first pair of driving surfaces spaced apart by an air gap;
   a pair of guide walls extending substantially perpendicular to said first pair of driving surfaces; and,
   a car removably coupled to said track, and operable in a first mode and a second mode, said car comprising: a single body section;
   a first pair of steerable wheels coupled to said body section, said first pair of steerable wheels having tires in contact with said first pair of driving surfaces in said first mode and a conventional road in said second mode;

a second pair of steerable wheels coupled to said body and arranged adjacent said first pair of steerable wheels, said second pair of steerable tires having tires arranged in contact with said first pair of driving surfaces in said first mode and said conventional road in said second mode;

a first pair of linked switching wheels movable between an engaged position, and a disengaged position;

a second pair of linked switching wheels movable between an engaged position, and a disengaged position; and, a pair of guide wheels each arranged on an opposing side of said single body section, said pair of guide wheels movable between an extended position when in said first mode and in a retracted position when in said second mode;

wherein said pair of driving surfaces each has a width that is greater than a width of said first pair of steerable tires and said second pair of steerable tires, further comprising: a first and second pair of rails extending substantially perpendicular to said first pair of driving surfaces and disposed in said air gap, each of said pair of rails having an operable side, said first and second pair of rails being arranged in a staggered relationship;

said first pair of rails and said second pair of rails are coupled to said first pair of driving surfaces further comprising a motor coupled to said first pair of linked switching wheels, said motor including means for rotating said first pair of linked switching wheels to substantially correspond to said car speed when said car transitions from said second mode to said first mode, wherein said car further comprises means for reducing air pressure in said first pair of tires and said second pair of tires in said second mode, wherein said track further includes a switching node, said switching node composing:

a second track portion having a second pair of driving surfaces, wherein said second pair of driving surfaces operably coupled said first pair of driving surfaces;

a third track portion extending from said second track portion and having a third pair of driving surfaces operably coupled to said second pair of driving surfaces;

a third rail having a first end and disposed between said second pair of driving surfaces, said third rail being arranged to engage one of said first pair of linked switching wheels, said third rail having a longitudinal shape substantially matching a longitudinal shape of said third track portion; and, a fourth rail having a second end adjacent said first end, said fourth rail being disposed between said pair of third driving surfaces and arranged to engage the other of said first pair of linked switching wheels;

wherein said first pair driving surface and said second pair of driving surface remain unobstructed by said third rail and fourth rail.

2. The mass transit system of claim 1 wherein said track further includes a service area, said service area having a transition point wherein said first pair of driving surfaces are coupled to said conventional road.

3. The mass transit system of claim 2 wherein said car further comprises:

a third pair of steerable tires coupled to said body section at an end opposite said first pair of steerable tires, said third pair of steerable tires in contact with said first pair of driving surfaces in said first mode and said conventional road in said second mode; and, a fourth pair of steerable tires coupled to said body section adjacent said third pair of steerable tires, said fourth pair of steerable tires in contact with said first pair of driving surfaces in said first mode and said conventional road in said second mode.

4. The mass transit system of claim 3 wherein said first pair of switching wheels is in said retracted position and said second pair of switching wheels are in said retracted position in said second mode.

* * * * *